March 9, 1926.

W. GOODMAN

SAFETY LINK

Filed April 2, 1924

1,576,424

Inventor

W. Goodman.

By Lacy & Lacy, Attorneys

Patented Mar. 9, 1926.

1,576,424

UNITED STATES PATENT OFFICE.

WILLIAM GOODMAN, OF PUEBLO, COLORADO.

SAFETY LINK.

Application filed April 2, 1924. Serial No. 703,759.

*To all whom it may concern:*

Be it known that I, WILLIAM GOODMAN, a citizen of the United States, residing at Pueblo, in the county of Pueblo and State of Colorado, have invented certain new and useful Improvements in Safety Links, of which the following is a specification.

This invention relates to improvements in safety links and has as its object to provide a novel form of link which may have various articles connected to it and which link will be so constructed as to prevent accidental separation of the said articles therefrom.

The link embodying the invention is not limited to any particular use, inasmuch as it may be employed in various ways as, for example, a key ring, a suspension link for a watch charm, a chain link, a clevis, or in fact in any connection where it is desired to anchor a part or object or connect together two or more objects or suspend the same.

Figure 1:
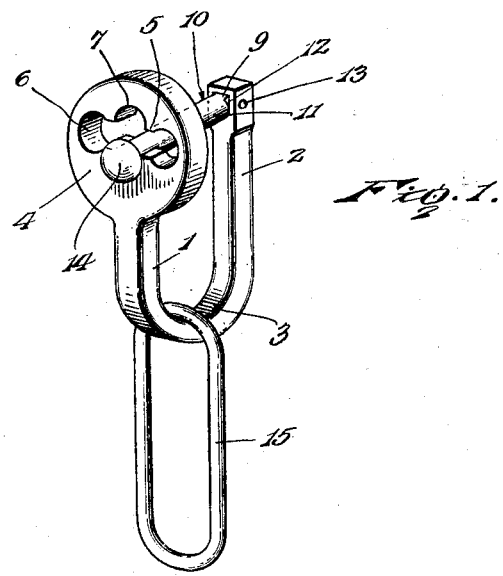
Figure 1 is a perspective view of one form of link embodying the invention.

The link embodying the invention comprises two spaced substantially parallel side members indicated one by the numeral 1 and the other by the numeral 2, these members being connected at their lower ends by an arcuate connecting portion indicated by the numeral 3. At its upper or free end, the side member 1 of the link is formed or provided with a flat sided preferably circular head indicated by the numeral 4 which head occupies a plane at right angles to the plane occupied by the two side members 1 and 2. The said head 4 is formed with a transverse slot 5 the ends of which have substantially circular enlargement indicated by the numeral 6. Notches 7 and 8 are formed respectively in the upper and lower walls of the slot 5 and are of substantially semi-circular form.

The side member 2 is formed in its upper end with an opening 9 which is of a diameter to freely accommodate one end of a guard member 10 comprising a preferably cylindrical stem 11 which has its said end flattened at its opposite sides, as at 12, and, as stated, loosely fitted in the opening 9, a pivot pin 13 being secured through the opposite side walls of the opening 9 and transversely through the said end of the stem 11. The other end of the stem extends through the slot 5 and is provided at its extremity and a short distance in advance of the outwardly presented face of the head 4 with a head 14 which is of a diameter such as would preclude said end of the stem being withdrawn through the slot 5.

The numeral 15 indicates, in the drawing, a member which is to be connected with the link, and in this instance the member is in the nature of an ordinary chain link.

Figure 2:
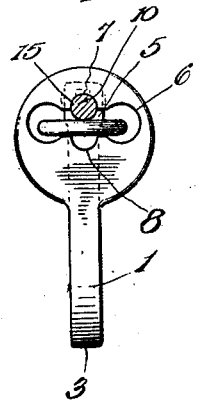
Figure 2 is a front elevation of the link illustrating the manner in which the member engaged therewith is to be manipulated so as to provide for its disengagement.
Figure 3:
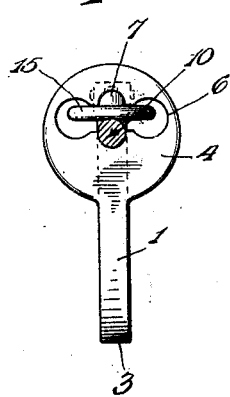
Figure 3 is a view similar to Figure 2 illustrating a further manipulation of the said member.

Assuming that the link embodying the invention is in the upright position shown in Figures 1, 2 and 3 of the drawings, the free end of the stem 11 will rest in the notch 8 as most clearly shown in Figure 3, and the link 15 will be suspended from the connecting portion 3 of the said link of the invention. It will be evident that the upper end of the link of the invention is closed by the guard member 10, so that there can be no accidental disengagement of the link 15 from the said link of the invention. However, when it becomes necessary to remove the link 15, this may be accomplished by sliding the link 15 upwardly about the side member 2 and inserting it at one end through the slot 5, thereby elevating the stem 11 to a position where it will occupy the notch 7. The link may then be further shifted in an endwise direction and slightly tilted so as to pass its said end over the head 14, the first position being shown in Figure 2 and the position assumed at this time by the link being shown in Figure 3, in which position the link will be above the said stem 11. The link 15 may then be withdrawn endwise in an opposite direction and thus completely disengaged from the device of the invention. A reversal of this operation will effect the engagement of the link 15 with the said device.

Figure 4:
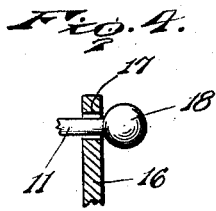
Figure 4 is a vertical sectional view through one side member of the link illustrating a slight modification.

In the embodiment illustrated in Figures 1, 2 and 3, the stem 11 is pivoted at one end in the opening 9 in the upper end of the side member 2, but in that form of the invention shown in Figure 4 of the drawing, the side member which is indicated in this instance by the numeral 16, is formed with an opening 17 preferably of circular form and of a diameter somewhat greater than the diameter of the said stem 11. The stem 11, in this embodiment, is formed at its end which engages through the opening 17, with a head 18 and this head is preferably of spherical form and of a diameter greater than that of the opening 17 so that, in view of the fact, as before stated, that the head 14 is of such diameter as to prevent withdrawal of the stem 11 through the slot 5 in the head 4, the stem, in this modified structure, cannot become accidentally disengaged because it cannot be withdrawn by movement in either endwise direction from either the slot 5 or the opening 17.

Having thus described the invention, what is claimed as new is:

1. A device of the class described comprising a ink including side members and a connecting portion, one of the said side members having a slot, and a guard member having pivotal connection at one end with the other side member and extending between the said side members and extending at its other end through the said slot.

2. A device of the class described comprising a link including side members and a connecting portion, one of the said side members having a transverse slot provided in its upper and lower walls with notches, and a guard member comprising a stem having pivotal connection at one end with the other side member and extending at its other end through the said slot and engageable in the said notches selectively.

3. A device of the class described comprising a link including side members and a connecting portion, one of the said side members having a transverse slot provided in its upper and lower walls with notches, and a guard member comprising a stem having pivotal connection at one end with the other side member and extending at its other end through the said slot and engageable in the said notches selectively, the said stem at its said other end being provided with a head of a diameter greater than the dimensions of the slot.

4. A device of the class described comprising a link including side members and a connecting portion, one of the said side members being provided at its free end with a head having a transverse slot, the ends of which are enlarged, the said slot being provided intermediate its ends in its upper and lower walls with notches, and a guard member comprising a stem having pivotal connection at one end with the other side member and extending at its other end through the said slot and provided at its last-mentioned end with a head.

In testimony whereof I affix my signature.

WILLIAM GOODMAN. [L. S.]